United States Patent [19]
Kodama

[11] Patent Number: 5,711,630
[45] Date of Patent: Jan. 27, 1998

[54] CONNECTOR-HOLDING STRUCTURE

[75] Inventor: Shinji Kodama, Shizuoka, Japan

[73] Assignee: Yazaki Corporation, Tokyo, Japan

[21] Appl. No.: 798,018

[22] Filed: Feb. 6, 1997

[30] Foreign Application Priority Data

Feb. 8, 1996 [JP] Japan .................. 8-022491

[51] Int. Cl.[6] .................................................. F16B 37/04
[52] U.S. Cl. .................... 403/329; 403/12; 411/182; 411/432
[58] Field of Search ........................... 403/11, 12, 329, 403/389, 384, 387; 411/182, 432

[56] References Cited

U.S. PATENT DOCUMENTS

| | | | |
|---|---|---|---|
| 4,923,347 | 5/1990 | Moryl et al. | 411/182 |
| 4,957,449 | 9/1990 | Hatagishi | 403/12 X |
| 5,000,693 | 3/1991 | Hatagishi et al. | 439/248 |

FOREIGN PATENT DOCUMENTS

| | | |
|---|---|---|
| 1-17827 | 5/1989 | Japan . |
| 2-285906 | 11/1990 | Japan . |
| 5-61908 | 8/1993 | Japan . |

*Primary Examiner*—Thomas R. Hannon
*Attorney, Agent, or Firm*—Armstrong, Westerman, Hattori, McLeland & Naughton

[57] ABSTRACT

A connector-holding member (6) has first elastic arms (1) which bend in a fitting direction of connectors, and second elastic arms (2) which bend in a direction perpendicular to the connector-fitting direction. Each second arm has a positioning projection (4) for positioning the holding member relative to the panel, and a guide portion (5) extending in the connector-fitting direction from the positioning projection (4) to a point close to the first elastic arm (1). The connector-holding member (6) is held in position, with the positioning projections (4) and the first arms (1) abutting against the panel from opposite sides thereof, and the connector-holding member (6) is movable in the connector-fitting direction within the range of the length of the guide portion (5).

8 Claims, 4 Drawing Sheets

5,711,630

1

CONNECTOR-HOLDING STRUCTURE

BACKGROUND OF THE INVENTION

1. Field of the Invention

This invention relates to a connector-holding structure which, in fitting a connector of a component such as a meter to one disposed via a connector-holding member in an automobile instrument panel or the like, makes the connector-holding member movable in the connector-fitting direction and in a direction perpendicular thereto so as to absorb the mounting and size errors of the component.

2. Description of the Related Art

FIG. 9 shows a conventional connector-holding structure as described in Japanese Utility Model Publication No. 1-17827.

In this structure, a connector-holding member 33 is rigidly mounted by means of clips 35 to an automobile instrument panel 34. The holding member 33 has elastic support arms 32 for movably supporting therebetween a male connector 31. To the male connector 31 thus movably supported by the support arms 32 is fitted a female connector 37 of a meter (component).

The male connector 31 includes a housing, a flange 38 at an intermediate portion of the housing, and lock projections 40 at a rear portion of the housing. The connector-holding member 33 includes an arm wall 39 and a plurality of opposed arms 32. The male connector 31 is supported in the connector-fitting direction with its intermediate flange 38 engaged with the front end of the arm wall 39 and its lock projections 40 engaged with the front ends of the arms 32. The male connector 31 is supported by the plurality of arms 32 to be movable laterally, i.e., in a direction perpendicular to the connector-fitting direction. With the structure as mentioned above, in mounting the meter 36 to the panel 34, if the male and female connectors 31 and 37 are off-centered relative to each other, the arms 32 absorb the positional error to allow the connectors 31 and 37 to be reliably connected. The meter 38 is rigidly fixed to the panel 34 with a not-shown bolt.

In the above conventional structure, however, the distance L between the panel 34 and the meter 38 must be precisely defined, and if, for example, the distance L is too large, a disadvantage may arise that the connectors 31 and 37 are insufficiently connected to each other. Accordingly, with a view to increasing the positional accuracy of the meter 36 relative to the panel 34, it has been necessary to improve the size accuracy of the meter 36, resulting in the cost of components increased.

SUMMARY OF THE INVENTION

This invention has been accomplished to overcome the above drawbacks and an object of this invention is to provide a connector-holding structure which, in mounting a component to a panel, enables a connector of the component to be reliably connected to a mating connector on the panel side even without precisely defining the distance between the panel and the component.

In order to attain the object, according to this invention, there is provided a connector-holding structure which comprises a panel having a mount opening formed therein; a first connector; a connector-holding member via which the first connector is disposed in the mount opening in the panel; a component having a second connector to be fitted to the first connector, which component is rigidly fixed to the panel; the connector-holding member having first elastic means bendable in a fitting direction of the first and second connectors, and second elastic means inserted into the mount opening and bendable in a direction perpendicular to the connector-fitting direction, the second elastic means having a projection for positioning the connector-holding member relative to the panel and a guide portion extending in the connector-fitting direction from the positioning projection to a point close to or in contact with the first elastic means, wherein the positioning projection and the first elastic means engage with the panel from opposite sides of the panel to hold the panel therebetween, and the connector-holding member is movable in the connector-fitting direction within a range of a length of the guide portion.

Preferably, the connector-holding structure further comprises a nut provided on the connector-holding member side and a bolt provided on the component side, the nut and the bolt being threaded to each other to fit the first and second connectors.

Preferably, the first elastic means has a bending stroke set larger than a fitting stroke between the first and second connectors, and a front end of the first elastic means is in contact with the panel when the first and second connectors are fitted.

The above and other objects, features and advantages of this invention will become apparent from the following description and the appended claims, taken in conjunction with the accompanying drawings in which like parts or elements are denoted by like reference characters.

DESCRIPTION OF THE PREFERRED EMBODIMENTS

Figure 1:
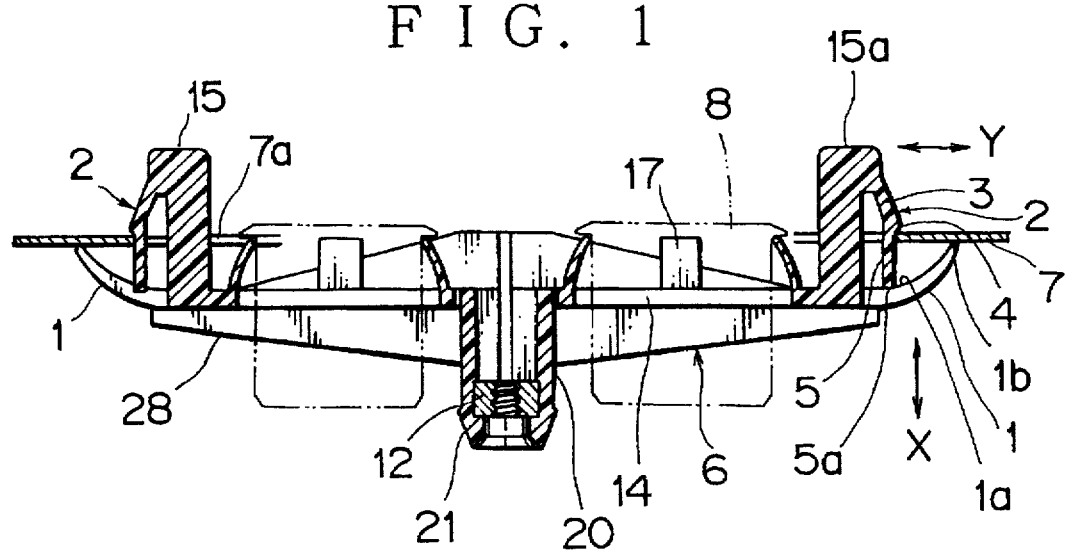
FIG. 1 is a longitudinal sectional view of a connector-holding member in a connector-holding structure according to this invention.

Embodiments of this invention will now be described with reference to the attached drawings.

FIGS. 1 to 5 show a connector-holding structure according to one embodiment of this invention.

In this structure, a connector-holding member 6 is front and back and left and right movably mounted in an opening in an instrument panel 7 by means of its first elastic arms 1—which bend front and back, i.e., in a fitting direction X of connectors—and second elastic arms 2—which bend left and right, i.e., in a direction Y perpendicular to the connector-fitting direction. The connector-holding member 6 holds a plurality of male connectors 8, and female connectors 10 of a meter (component) 9 are fitted thereto by using a bolt 11 threaded into a nut 12.

Figure 2:
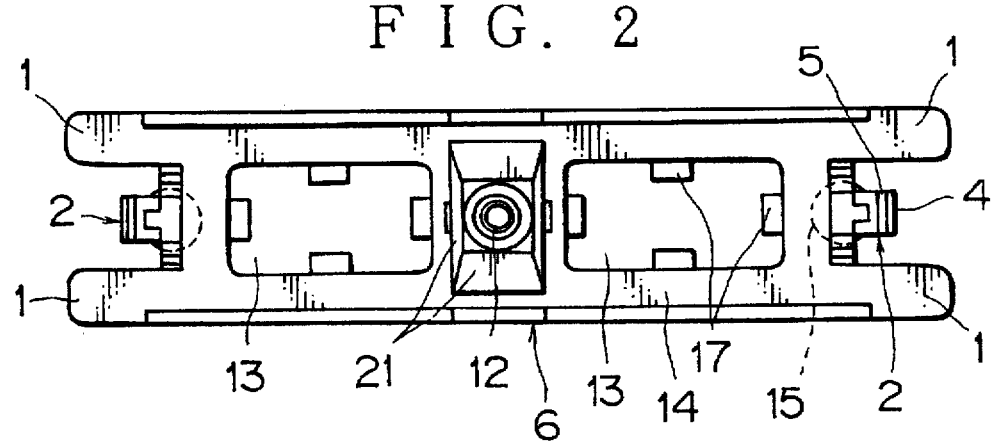
FIG. 2 is a plan view of the connector-holding member as shown in FIG. 1.

The connector-holding member 6 is formed of synthetic resin and, as shown in FIGS. 1 and 2, comprises a frame-like base plate 14 having a pair of connector insertion holes 13, a pair of the above-mentioned first elastic arms 1 provided at each longitudinally opposite end of the base plate 14 and curved outwardly rearwardly to the instrument panel 7, a support 15 provided between the first elastic arms 1, 1 at each end of the base plate 14, the support being upright in the direction of the panel 7, and the above-mentioned second elastic arm 2 provided on the outer side of each support 15, the second elastic arm extending from a rear end portion of the support 15 to the side of the meter 9, i.e., in a direction opposite to the curved direction of the first elastic arm 1.

The second elastic arm 2 is made up of an inclined portion 3 protruding obliquely forwardly from the support 15, a positioning projection 4 disposed on the outer side at the front end of the inclined portion 3, and a guide portion 5 extending from the front end of the inclined portion 3 in substantially parallel to the support 15, i.e., substantially perpendicular to the panel 7. The second elastic arm 2 is featured by the guide portion 5 which extends long from the position of the positioning projection 4. The guide portion 5 has its front end 5a located close to or in contact with an inner curved surface 1a of the first elastic arm 1 near the base thereof.

The guide portions 5 are slidable along the panel 7, with the positioning projections 4, when in contact with the panel 7, locking the guide portions 5 from coming out. More specifically, the supports 15 are at the side of their ends 15a inserted into a panel opening 7a, causing the second arms 2 to bend until the positioning projections 4 ride over the panel 7, at which the guide portions 5 become slidable along end surfaces of the panel opening 7a in the insertion direction of the supports 15, with surfaces 4a (FIG. 3) of the positioning projections 4, when in contact with the rear side of the panel 7, preventing the supports 15 from coming out. The front ends 1b of the first elastic arms 1 contact the front surface of the panel 7. The connector-holding member 6 is mounted to the panel 7 in the form where the positioning projections 4 of the second arms 2 and the front ends 1b of the first arms 1 hold the panel 7 therebetween.

Figure 3:
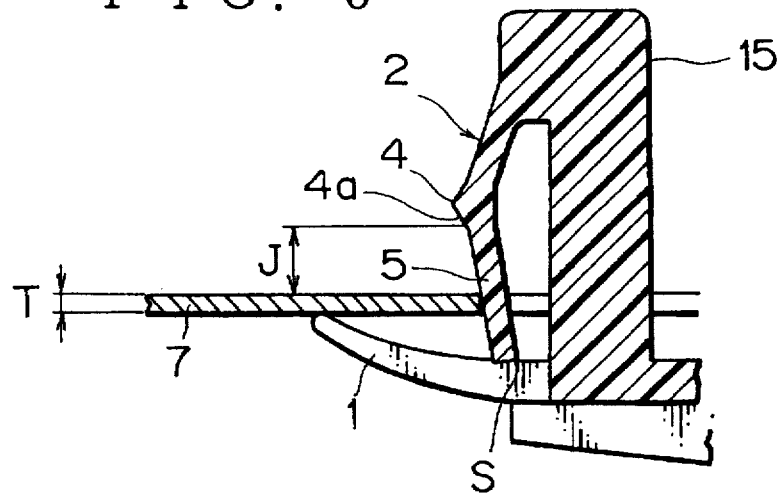
FIG. 3 is a partial longitudinal sectional view showing elastic arms of the connector-holding member in engagement with a panel.

The connector-holding member 6, as shown in FIG. 3, is movable relative to the panel 7 in a fitting direction of connectors by the bending action of the first elastic arms 1. The gap S between the second elastic arm 2 and the first elastic arm 1 is set smaller than the plate thickness T of the panel 7 (no gap provided in the present example), so that the guide portion 5 is not disengaged from the panel 7 during its movement along the panel 7.

Figure 4:
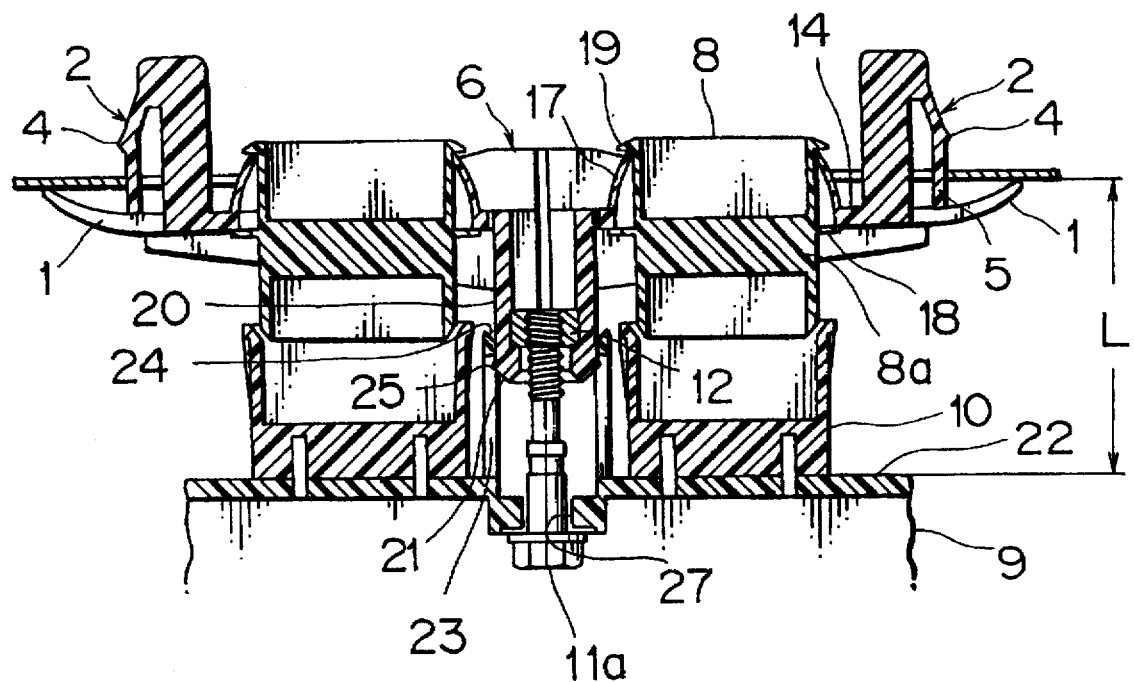
FIG. 4 is a longitudinal sectional view showing the state where a meter-side connector is to be fitted to a connector on the connector-holding member side.

As shown in FIGS. 1 and 2, resilient connector supports 17 are so provided at four sides of each connector insertion hole 13 in the connector-holding member 6 as to protrude rearwardly inwardly. As shown in FIG. 4, a male connector 8 includes a housing 8a and an intermediate flange 18 and end projections 19, each integral with the housing, and is front and back and left and right movably supported, with the intermediate flange 18 engaged with base plate 14 and the end projections 19 locked on the ends of the supports 17. Further, a nut-holding tube 20, as shown in FIGS. 1 and 2, protrudes forwardly from the base plate 14 between the paired connector insertion holes 13, 13. The nut-holding tube 20 has a nut 12 fixed inside thereof towards its front end which is at opposite outer sides tapered inwardly to provide guide surfaces 20. At transversely opposite ends of the base plate 14 on the side where the nut-holding tube 20 protrudes, there are provided substantially trapezoid ribs 28.

Figure 5:
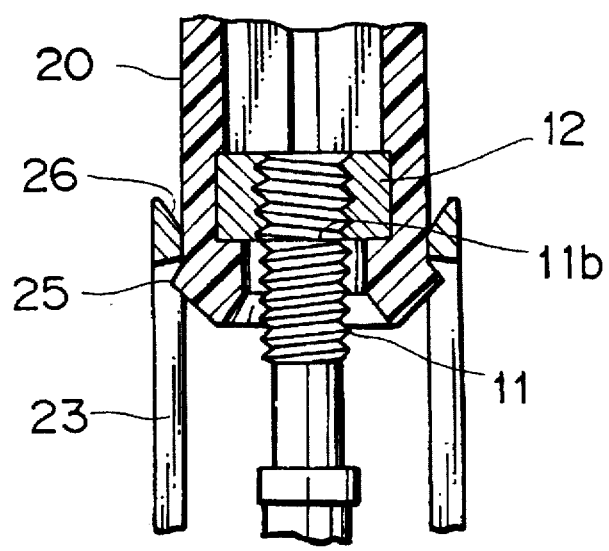
FIG. 5 is a partial longitudinal sectional view showing a screw-threading fitting mechanism.

FIG. 4 shows the state where, by the threading operation of the bolt 11 into the nut 12, female connectors 10 of the meter 9 are fitted to male connectors 8 mounted in the connector-holding member 6. A tube 23 is provided upright on a base plate 22 on the meter side, which corresponds to the nut-holding tube 20 of the connector-holding member 6 and has inner guide surfaces 24 formed inside the front end thereof. The front guide surfaces 21 of the nut-holding tube 20 are smoothly guided along the guide surfaces 24 into the tube 23. When preliminary locking projections 25 on the periphery at the front end of the tube 20 engage inner projections 26 at the front end of the tube 23 from inside as shown in FIG. 5, the meter 9 is preliminarily locked to the connector-holding member 6.

Figure 6:
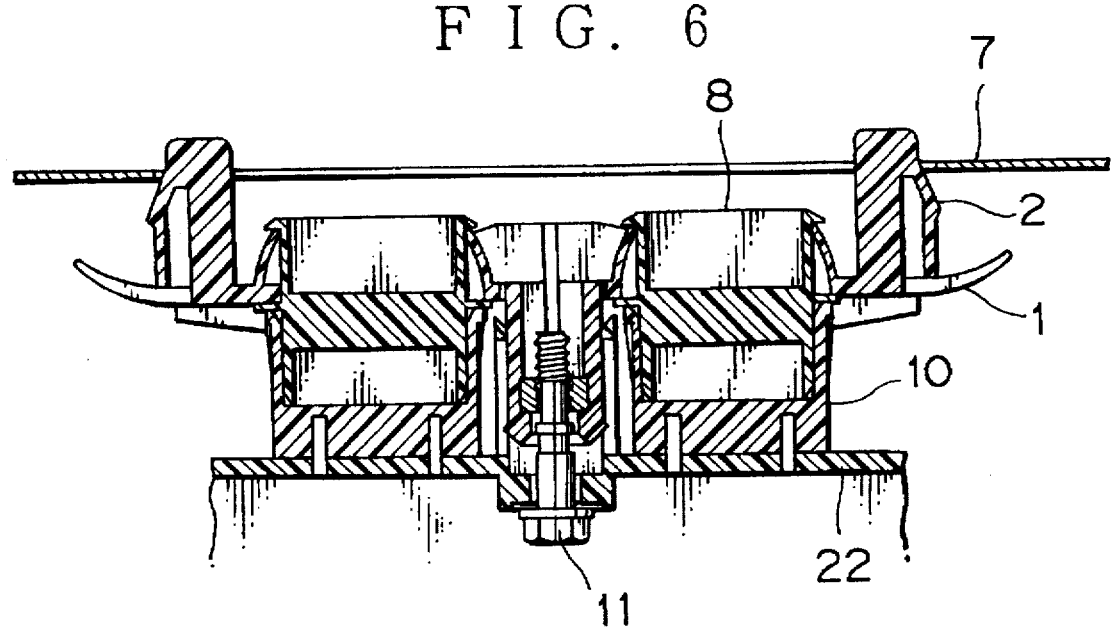
FIG. 6 is a longitudinal sectional view showing the state where the connectors are fitted.

The bolt 11 is disposed at a center inside the tube 23 and has a bolt head 11a (FIG. 4) protruding out through a hole 27 formed in the meter side base plate 22. FIG. 5 shows the state where the front end 11b of the bolt 11 abuts against the nut 12 to push the connector-holding member 6 rearwardly, so that the latter takes the position as shown in FIG. 4 in which the first arms 1 are pressed and largely bent (flattened) as shown in FIG. 3, while at the same time the positioning projections 4 of the individual second arms 2 largely part from the panel 7 as indicated at J. In this state, the bolt 11 is rotated and threaded into the nut 12 to pull the connector-holding member 6 apart from the instrument panel 7 towards the meter 9 as shown in FIG. 6.

In the state in FIG. 4, the meter 9 is rigidly fixed to the panel 7 by not-shown bolts. In this instance, both connectors 8 and 10 are always reliably fitted to each other irrespective of variations in the distance L between the panel 7 and the meter 9, since their mounting errors are absorbed within the range of the length of the guide portions 5 of the second arms 2, resulting in not-shown terminals inside connectors 8 and 10 reliably electrically connected to each other. The first arms 1 bent rearwardly serve as a stopper at the time of the pushing as mentioned above.

Where the bolt 11 is not used and instead connectors 10 of the meter 9 are pushed into the individual connectors 8 on the panel side, it is possible, when the distance L between the panel 7 and the meter 9 is greater than a predetermined value, to cause an insufficient fitting between the connectors. Where the bolt 11 is used, however, there is no such fear, since the holding member 6 and thus the connectors 8 are pulled up by the bolt 11. Thus, it is preferred in the present structure that the bolt 11 and the nut 12 are used.

The present structure is applicable not only to the mounting of a meter to an instrument panel as described above, but also to the mounting between all kinds of panels and components.

Figure 7:
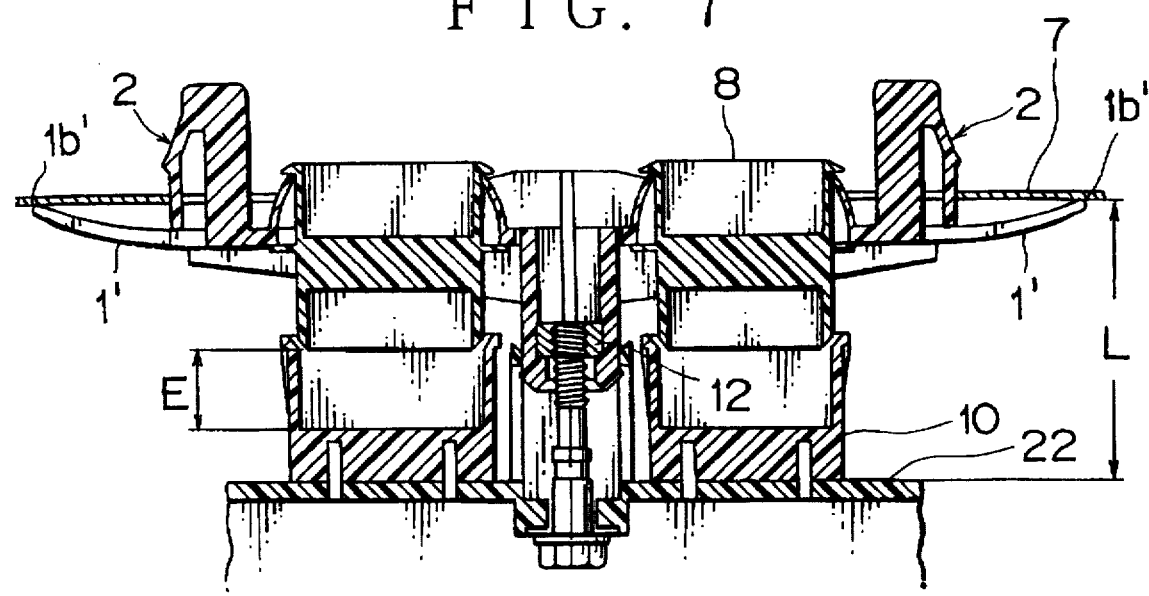
FIG. 7 is a longitudinal sectional view of a connector-holding member with longer first elastic arms according to another embodiment of this invention, shown with the connectors yet to be fitted.
Figure 8:
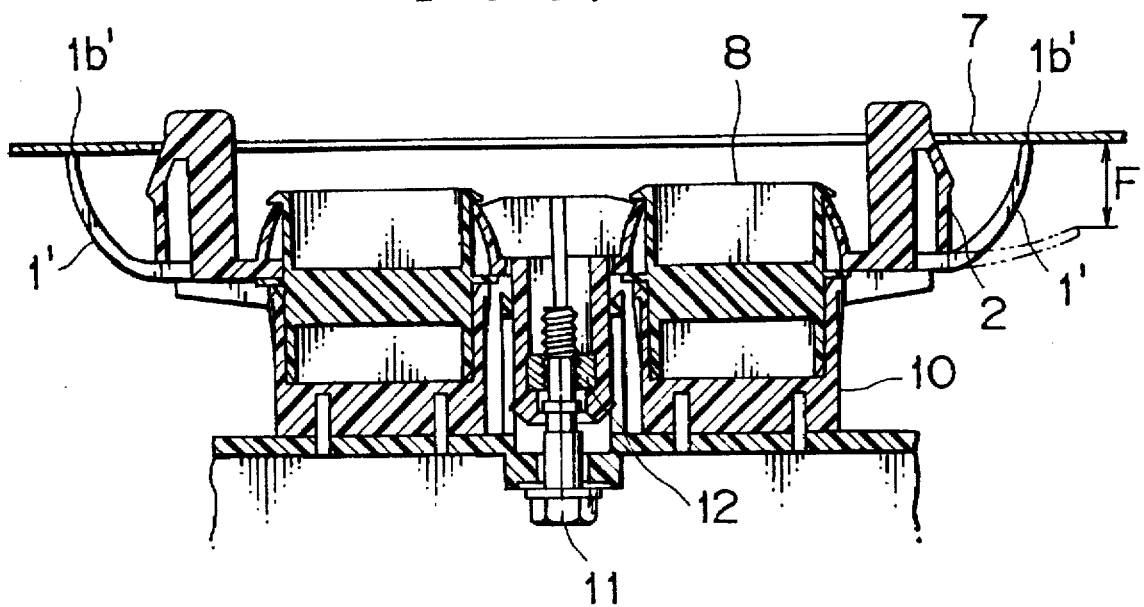
FIG. 8 is a longitudinal sectional view of the connector-holding member of FIG. 7, shown with the connectors fitted to each other.
Figure 9:
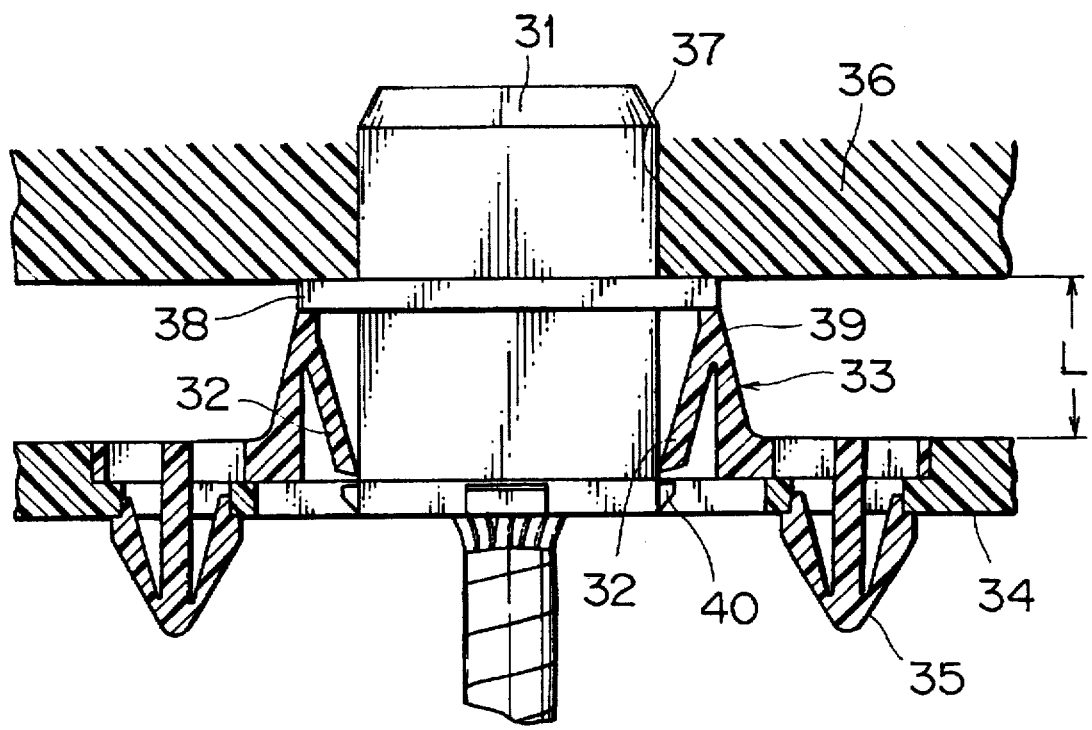
FIG. 9 is a longitudinal sectional view of a conventional connector-holding structure.

In the preceding example, the first elastic arms 1 are separated from the panel 7 in the connector-fitted state as shown in FIG. 6, which may give rise to a drawback that first arms 1 interfere with the panel 7 and/or second arms 2 to cause sounds or the like due to vibrations during the running of a vehicle. To overcome this possible drawback, according to another embodiment of this invention, as shown in FIGS. 7 and 8, the first elastic arms 1' are of larger length than those in the preceding example so that their front ends 1b' contact the panel 7 with a certain degree of spring force even in the connector-fitted state as shown in FIG. 8.

More specifically, the bending stroke F of the first arm 1' is set larger than the fitting stroke E between the male connector 8 and the female connector 10. The bending stroke F is intended to mean the vertical length between the arm 1' in the pressed state as in FIG. 7 and in the extended state as in FIG. 8. The above prevents the arms 1' from oscillating during the vehicle running and thus interfering with the panel 7 and the second arms 2. As a result, production of sounds and/or damages to the arms 1 and 2 are prevented. The constituent parts in the example in FIGS. 7 and 8 excluding the first arms 1 are the same in structure with those in the preceding example.

Having now fully described the invention, it will be apparent to one of ordinary skill in the art that many changes and modifications can be made thereto without departing from the spirit and scope of the invention as set forth herein.

What is claimed is:

1. A connector-holding structure comprising:

a panel having a mount opening formed therein;

a first connector;

a connector-holding member via which said first connector is disposed in said mount opening in said panel;

a component having a second connector to be fitted to said first connector, which component is rigidly fixed to said panel;

said connector-holding member having first elastic means bendable in a fitting direction of said first and second connectors, and second elastic means inserted into said mount opening and bendable in a direction perpendicular to said connector-fitting direction, said second elastic means having a projection for positioning said connector-holding member relative to said panel and a guide portion extending in said connector-fitting direction from said positioning projection to a point close to or in contact with said first elastic means, wherein said positioning projection and said first elastic means engage with said panel from opposite sides of said panel to hold said panel therebetween, and said connector-holding member is movable in said connector-fitting direction within a range of a length of said guide portion.

2. The connector-holding structure according to claim 1, wherein two of said first elastic means are provided at opposite ends of said connector-holding member, and each of said two first elastic means comprises a pair of elastic arms extended outwardly and curved rearwardly to said panel.

3. The connector-holding structure according to claim 2, wherein two of said second elastic means are provided at said opposite ends of said connector-holding member, each between said paired elastic arms such that said guide portions of said two second elastic means slide along end surfaces at opposite sides of said mount opening.

4. The connector-holding structure according to claim 3, wherein said connector-holding member further comprises supports provided at said opposite ends thereof, each extending in said connector-fitting direction into said mount opening, and wherein said two second elastic means are provided on outer sides of said supports.

5. The connector-holding structure according to claim 1, wherein said connector-holding member has a connector insertion hole formed therein through which said first connector protrudes towards said second connector on said component side.

6. The connector-holding structure according to claim 1, further comprising a nut provided on said connector-holding member side and a bolt provided on said component side, said nut and said bolt being threaded to each other to fit said first and second connectors.

7. The connector-holding structure according to claim 6, wherein said bolt is provided on a side of said connector-holding member opposite the side where said second elastic means is provided, and extends in said connector-fitting direction towards said nut.

8. The connector-holding structure according to claim 1, wherein said first elastic means has a bending stroke set larger than a fitting stroke between said first and second connectors, and a front end of said first elastic means is in contact with said panel when said first and second connectors are fitted.

\* \* \* \* \*